United States Patent [19]
Scott et al.

[11] Patent Number: 5,856,831
[45] Date of Patent: Jan. 5, 1999

[54] CLAMPING SYSTEM AND METHOD FOR CLAMPING FLOATING POINT COLOR VALUES FROM A GEOMETRY ACCELERATOR IN A COMPUTER GRAPHICS SYSTEM

[75] Inventors: Noel D. Scott; John R. Pessetto, both of Fort Collins, Colo.

[73] Assignee: Hewlett-Packard Company, Palo Alto, Calif.

[21] Appl. No.: 662,094

[22] Filed: Jun. 12, 1996

[51] Int. Cl.⁶ ........................................... G06F 15/16
[52] U.S. Cl. ...................... 345/503; 345/418; 345/523; 345/513; 364/748.01
[58] Field of Search .................... 345/501–503, 345/507, 513, 523–525, 418–419, 429–433, 440–443; 364/748.01, 748.03

[56] References Cited

U.S. PATENT DOCUMENTS

| | | | |
|---|---|---|---|
| 5,347,618 | 9/1994 | Akeley | 345/421 |
| 5,384,723 | 1/1995 | Karim et al. | 364/715.04 |
| 5,404,324 | 4/1995 | Colon-Bonet | 364/761 |
| 5,463,574 | 10/1995 | Desrosiers et al. | 364/748.01 |
| 5,469,377 | 11/1995 | Amano | 364/748.03 |

*Primary Examiner*—Kee M. Tung

[57] ABSTRACT

A clamping system is designed to clamp floating point values from a geometry accelerator in a computer graphics system. The clamping system includes a register configured to receive the floating point value from a connection from the geometry accelerator in the graphics system. Logic associated with the register is configured to determine when the value is less than or equal to a first threshold value (preferably, 0), greater than or equal to a second threshold value (preferably, 1), and between the first and second threshold values. An output mechanism is controlled by the logic. In the preferred embodiment, the output mechanism is a multiplexer interconnected with a tristate driver. The output mechanism is configured to output onto the connection the first threshold value when the color value is less than or equal to the first threshold value, to output onto the connection the second threshold value when the color value is greater than or equal to the second threshold value, and to output onto the connection the originally received floating point value when the floating point value is between the first and second threshold values. An absolute value logic mechanism is associated with the clamping system. The absolute value logic mechanism is configured to force a sign bit of the value that is output by the output mechanism to exhibit a positive state so that the absolute value of an incoming floating point value can be accomplished.

23 Claims, 5 Drawing Sheets

CLAMPING SYSTEM AND METHOD FOR CLAMPING FLOATING POINT COLOR VALUES FROM A GEOMETRY ACCELERATOR IN A COMPUTER GRAPHICS SYSTEM

FIELD OF THE INVENTION

The present invention generally relates to computer graphics systems and, more particularly, to a clamping system and method for clamping floating point (fp) values from a geometry accelerator in a computer graphics system.

BACKGROUND OF THE INVENTION

Computer graphics systems are commonly used for displaying graphical representations of objects on a two-dimensional video display screen. Current computer graphics systems provide highly detailed representations and are used in a variety of applications.

In typical computer graphics systems, an object to be represented on the display screen is broken down into graphics primitives. Primitives are basic components of a graphics display and may include points, lines, vectors, and polygons, such as triangles and quadrilaterals. Typically, a combined hardware and software system is implemented to render, or draw, the graphics primitives that represent a view of one or more objects being represented on the display screen.

The primitives of a three dimensional (3-D) object to be rendered are defined by a host computer in terms of primitive data. For example, when the primitive is a triangle, the host computer may define the primitive in terms of the X, Y and Z coordinates of its vertices, as well as in terms of the red, green and blue (R, G and B) color values of each vertex. Additional primitive data may be used in specific applications. Rendering hardware interpolates the primitive data to compute the display screen pixels that represent each primitive and the R, G, and B color values for each pixel.

The basic components of a computer graphics system generally include a geometry engine, or geometry accelerator, a rasterizer, and a frame buffer. The system may also include texture mapping hardware. The geometry accelerator receives from the host computer primitive data that defines the primitives that make up the view to be displayed. The geometry accelerator performs transformations on the primitive data, such as decomposing quadrilaterals into triangles, and performs lighting, clipping, and plane equation calculations for each primitive. The output of the geometry accelerator is rendering data used by the rasterizer and the texture mapping hardware to generate final coordinate and color data for each pixel in each primitive. The pixel data from the rasterizer and, if available, the pixel data from the texture mapping hardware are combined and stored in the frame buffer for display on the video display screen.

In regard to the lighting calculations that are performed by the geometry accelerator, red, green, and blue color values are determined for each vertex by summing the ambient color and the diffuse and specular color contribution for each of the active light sources in the scene. A scene may have several light sources of different types.

The operations of the geometry accelerator are highly computation intensive. One frame of a graphics display may include thousands of primitives. To achieve state of the art performance, the geometry accelerator may be required to perform on the order of several hundred million floating point (fp) calculations per second. Furthermore, the volume of data transferred between the host computer and the graphics hardware is very large. The data for a single quadrilateral may be on the order of 64 words, each word being 32 bits. Additional data transmitted from the host computer to the geometry accelerator includes lighting parameters, clipping parameters, and any other parameters needed to generate the graphics display.

Various techniques have been employed to improve the performance of geometry accelerators, including pipelining and multiprocessing. Nonetheless, a need continues in the industry for additional improvements that will increase performance.

Several problems arise when the lighting calculations are performed in hardware in geometry accelerators. One problem involves clamping the fp results of the lighting equations to a value between 0 and 1, inclusive. The results must be clamped to within this range so that no overflow occurs downstream of the geometry accelerator. Overflow can occur because the hardware that is downstream of the accelerator generally utilizes fixed precision arithmetic. Another problem that arises with performing lighting calculations with hardware involves taking the absolute value of a result. These and other problems are addressed and solved herein by the present invention.

SUMMARY OF THE INVENTION

Briefly described, the invention is a clamping system and method for clamping floating point (fp) values from a geometry accelerator in a computer graphics system. Although not limited to this particular application, the invention is particularly suited to clamp fp values from lighting calculations that are performed in a geometry accelerator.

In architecture, the clamping system includes a register configured to receive the fp value from a connection from the geometry accelerator in the graphics system. Logic associated with the register is configured to determine when the value is less than or equal to a first threshold value (preferably, 0), greater than or equal to a second threshold value (preferably, 1), and between the first and second threshold values. An output mechanism is controlled by the logic. In the preferred embodiment, the output mechanism is a multiplexer (mux) interconnected with a tristate driver. The output mechanism is configured to output onto the connection the first threshold value when the color value is less than or equal to the first threshold value, to output onto the connection the second threshold value when the color value is greater than or equal to the second threshold value, and to output onto the connection the originally received fp value when the fp value is between the first and second threshold values.

In accordance with another feature of the clamping system, an absolute value logic mechanism is associated with the clamping system. The absolute value logic mechanism is configured to force a sign bit of the value that is output by the output mechanism to exhibit a positive state so that the absolute value of an incoming fp value can be accomplished.

The invention can also be conceptualized as a methodology for clamping fp values from a geometry accelerator. In this regard, the method can be broadly summarized as follows: receiving a fp value on a connection from a geometry accelerator; determining when the value is less than or equal to a first threshold value, greater than or equal to a second threshold value, and between the first and second threshold values; outputting onto the connection the first threshold value when the fp value is less than or equal to the first threshold value; outputting onto the connection the second threshold value when the fp value is greater than the second threshold value; and outputting onto the connection the fp value when the fp value is between the first and second threshold values.

Other objects, features, and advantages of the present invention will become apparent to one with skill in the art upon examination of the following drawings and detailed description. It is intended that all such additional objects, features, and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating principles of the present invention. In the drawings, like reference numerals designate corresponding parts throughout the several views.

DETAILED DESCRIPTION OF THE PREFERRED EMBODIMENT

The clamping system and method of the invention is utilized within a computer graphics system.

I. Computer Graphics System

Figure 1A:
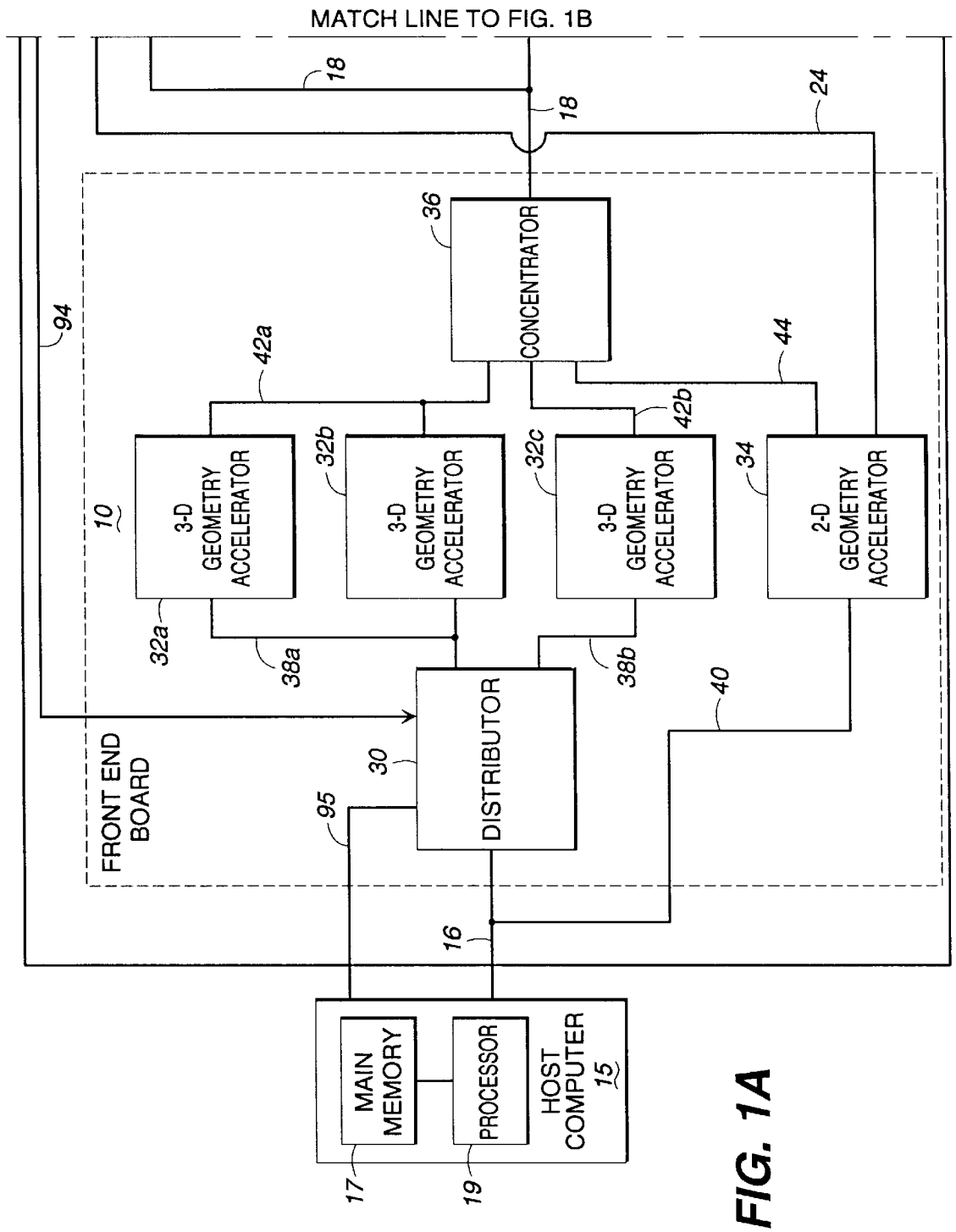
FIGS. 1a and 1b are an electronic block diagram of a possible implementation of a computer graphics system that can employ the clamping system and method of the invention.
Figure 1B:
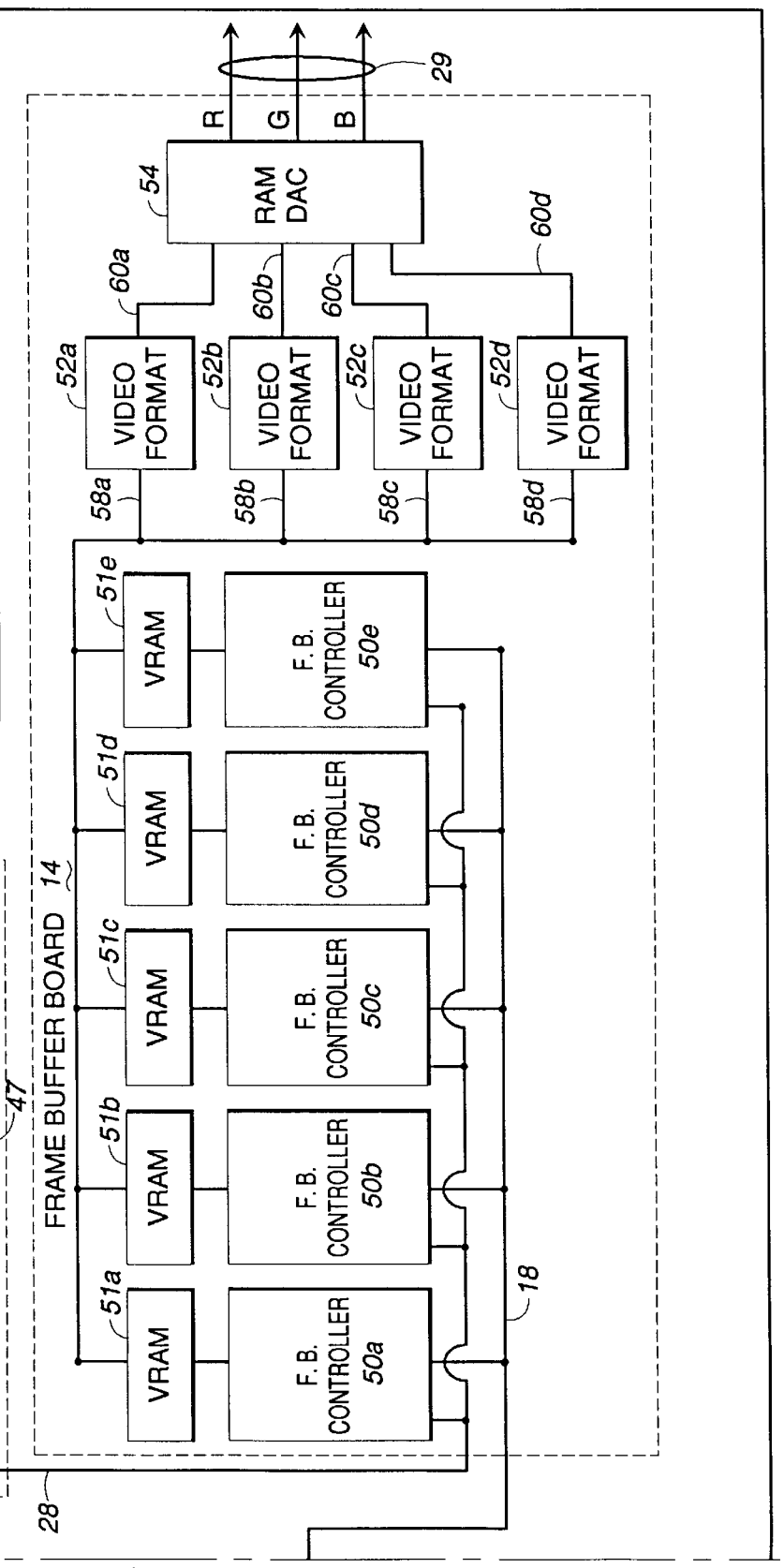

An example of a possible implementation of a computer graphics system 11 is shown in FIG. 1. As shown in FIG. 1, the system 11 includes a front end board 10, a texture mapping board 12, and a frame buffer board 14. The front end board communicates with a host computer 15 over a 52-bit bus 16. The front end board receives primitives to be rendered from the host computer over bus 16. The primitives are specified by X,Y,Z coordinate data, R, G and B color data, alpha, normals and texture S,T coordinates for portions of the primitives, such as for the vertices when the primitive is a triangle.

Data representing the primitives in three dimensions then is provided by the front end board 10 to the texture mapping board 12 and the frame buffer board 14 over 64-bit bus 18. The texture mapping board interpolates the primitive data received to compute the screen display pixels that will represent the primitive, and determines corresponding resultant texture data for each primitive pixel. The resultant texture data is provided to the frame buffer board over five 11-bit buses 28, which are shown in FIG. 1 as a single bus for clarity of illustration.

The frame buffer board 14 also interpolates the primitive data received from the front end board 10 to compute the pixels on the display screen that will represent each primitive, and to determine object color values for each pixel. The frame buffer board then combines, on a pixel by pixel basis, the object color values with the resultant texture data provided from the texture mapping board, to generate resulting image R,G,B values for each pixel. R,G,B color control signals for each pixel are respectively provided over R,G,B lines 29 to control the pixels of the display screen (not shown) to display a resulting image on the display screen that represents the texture mapped primitive.

The front end board 10, texture mapping board 12 and frame buffer board 14 each is preferably pipelined and operates on multiple primitives simultaneously. While the texture mapping and frame buffer boards operate on primitives previously provided by the front end board, the front end board continues to operate upon and provide new primitives until the pipelines in the boards 12 and 14 become full.

The front end board 10 may include a distributor chip 30, 3 three-dimensional (3-D) geometry accelerator chips 32a, 32b and 32c, a two-dimensional (2-D) geometry accelerator chip 34 and a concentrator chip 36. The distributor chip 30 receives the X,Y,Z coordinate and color primitive data over bus 16 from the host computer, and distributes 3-D primitive data evenly among the 3-D geometry accelerator chips 32a, 32b and 32c. In this manner, the system bandwidth is increased because three groups of primitives are operated upon simultaneously. Data is provided over 40-bit bus 38a to the 3-D geometry accelerator chips 32a and 32b. and over 40-bit bus 38b to chip 32c. Both buses 38a and 38b transfer data at a rate of 60 MHZ and provide sufficient bandwidth to support two 3-D geometry accelerator chips. 2-D primitive data is provided over a 44-bit bus 40 to the 2-D geometry accelerator chip 34 at a rate of 40 MHZ.

Each 3-D geometry accelerator chip transforms the X,Y,Z coordinates that define the primitives received into corresponding screen space coordinates, determines object R,G,B values and texture S,T values for the screen space coordinates, decomposes quadrilaterals into triangles, calculates partial slope information, performs lighting calculations and computes a triangle plane equation to define each triangle. Each 3-D geometry accelerator chip also performs view clipping operations to ensure an accurate screen display of the resulting image when multiple windows within the screen are displayed, or when a portion of a primitive extends beyond the view volume represented on the display screen. Relevant operations performed by each 3-D geometry accelerator chip are described in more detail below. Output data from the 3-D geometry accelerator chips 32a–32c is provided over 44-bit buses 42a, 42b to concentrator chip 36 at a rate of 60 MHZ. Two-dimensional geometry accelerator chip 34 also provides output data to concentrator chip 36 over a 46-bit bus 44 at a rate of 45 MHz. Concentrator chip 36 combines the 3-D primitive output data received from the 3-D geometry accelerator chips 32a–32c, re-orders the primitives to the original order they had prior to distribution by the distributor chip 30, and provides the combined primitive output data over bus 18 to the texture mapping and frame buffer boards.

Texture mapping board 12 includes a texture mapping chip 46 and a local memory 48 which is preferably arranged as a cache memory. In a preferred embodiment of the invention, the cache memory is formed from a plurality of SDRAM (synchronous dynamic random access memory) chips. The cache memory 48 stores texture map data associated with the primitives being rendered in the frame buffer board. The texture MIP map data is downloaded from a main memory 17 of the host computer 15, over bus 40, through the 2-D geometry accelerator chip 34, and over 24-bit bus 24.

The texture mapping chip 46 successively receives primitive data over bus 18 representing the primitives to be rendered on the display screen. As discussed above, the primitives provided from the 3-D geometry accelerator chips 32a–c include lines and triangles. The texture mapping board does not perform texture mapping of points or lines, and operates only upon triangle primitives. The data representing the triangle primitives includes the X,Y,Z object pixel coordinates for at least one vertex, the object color R,G,B values of the at least one vertex, the coordinates in S,T of the portions of the texture map that correspond to the at least one vertex, and the plane equation of the triangle. The texture mapping chip 46 ignores the object pixel z coordinate and the object color R,G,B values. The chip 46 interpolates the X,Y pixel coordinates to calculate S,T coordinates that correspond to each X,Y screen display pixel that represents the primitive. For each pixel, the texture mapping chip accesses the portion of the texture MIP map that corresponds thereto from the cache memory, and computes resultant texture data for the pixel, which may include a weighted average of multiple texels.

The resultant texture data for each pixel is provided by the texture mapping chip 46 to the frame buffer board over five buses 28. The five buses 28 are respectively coupled to five frame buffer controller chips 50a–50e provided on the frame buffer board, and provide resultant texture data to the frame buffer controller chips in parallel. The frame buffer controller chips 50a–50e are respectively coupled to groups of associated VRAM (video random access memory) chips 51a–51e. The frame buffer board may further include four video format chips, 52a–52d, and a RAMDAC (random access memory digital-to-analog converter) 54. The frame buffer controller chips control different, non-overlapping segments of the display screen. Each frame buffer controller chip receives primitive data from the front end board over bus 18, and resultant texture mapping data from the texture mapping board over bus 28. The frame buffer controller chips interpolate the primitive data to compute the screen display pixel coordinates in their respective segments that represent the primitive, and the corresponding object R,G,B color values for each pixel coordinate. For those primitives (i.e., triangles) for which resultant texture data is provided from the texture mapping board, the frame buffer controller chips combine, on a pixel by pixel basis, the object color values and the resultant texture data to generate final R,G,B values for each pixel to be displayed on the display screen. A blending mode defining the manner in which the object and texture color values are combined is controlled by a rendering mode control word that is provided over bus 28.

The resulting image video data generated by the frame buffer controller chips 50a–50e, including R,G,B values for each pixel, is stored in the corresponding VRAM chips 51a–51e. Each group of VRAM chips 51a–51e includes eight VRAM chips, such that forty VRAM chips are located on the frame buffer board. Each of video format chips 52a–52d is connected to, and receives data from, a different set of ten VRAM chips. The video data is serially shifted out of the VRAM chips and is respectively provided over 64-bit buses 58a–58d to the four video format chips 52a–52d at a rate of 27 MHZ. The video format chips format the video data so that it can be handled by the RAMDAC and provide the formatted data over 32-bit buses 60a, 60b, 60c and 60d to RAMDAC 54 at a rate of 33 MHZ. RAMDAC 54, in turn, converts the digital color data to analog R,G,B color control signals and provides the R,G,B control signals for each pixel to a screen display (not shown) along R,G,B control lines 29.

II. Geometry Accelerator

Figure 2:
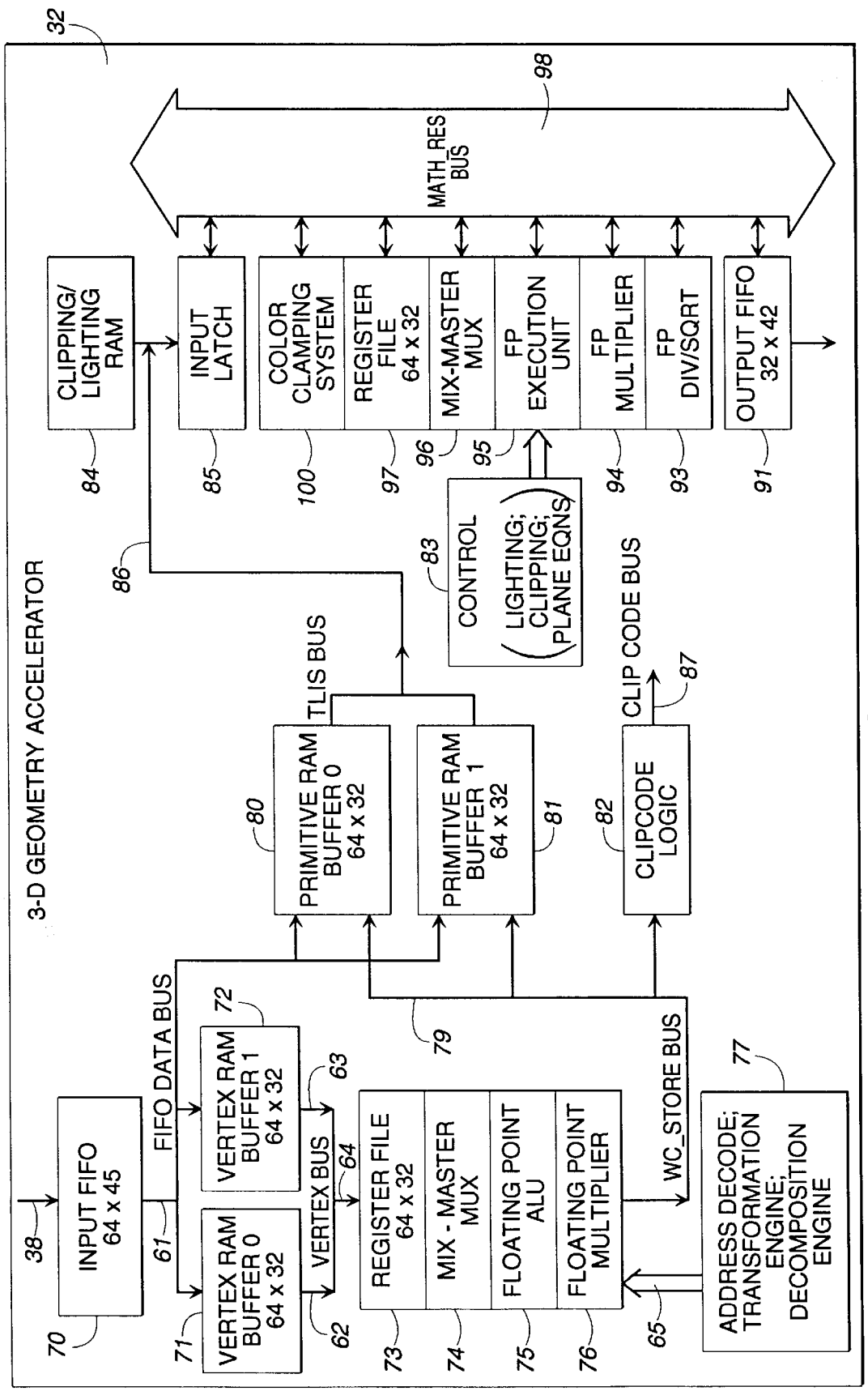
FIG. 2 is an electronic block diagram of a possible implementation of a 3-D geometry accelerator that incorporates the clamping system of the invention.

A simplified block diagram representative of geometry accelerator chips 32a–32c is shown in FIG. 2. Primitive data from host computer 15 is supplied through an input FIFO 70 to a double-buffered vertex RAM which includes vertex RAM (buffer 0) 71 and vertex RAM (buffer 1) 72. Each geometry accelerator 32a–32c includes two separate processors in a pipeline configuration. A left stack includes clip code logic 82, a register file 73, a multiplexer (mux) 74, a fp execution unit 75 and a fp multiplier 76. Operations of the left stack are controlled by a left stack control unit 77, which includes address decode logic, a transformation engine, and a decomposition engine.

Results from the left stack are supplied to a right stack through a double-buffered primitive RAM, including a primitive RAM (buffer 0) 80 and a primitive RAM (buffer 1) 81. Data is transferred from the double-buffered primitive RAM to an input latch 85. The input latch 85 receives this data and also data from a clipping/lighting RAM 84. The clipping/lighting RAM 84 stores parameters of each light source, except for the spotlight powers and the specular power.

The components of the right stack communicate via a math result bus 98. The right stack includes a clamping system 100 (see FIG. 4 for more details) of the present invention, a register file 97, a mux 96, a fp execution unit 95, a fp multiplier 94, and a fp divide/square root unit 93. The foregoing components can exchange data on the bus 98. Some of these components can only read or only write data, while others can do both. Results from the right stack are supplied from the math result bus 98 to the texture mapping board 12 and to the frame buffer board 14 (FIG. 1) via an output FIFO buffer 91 that is connected to the math result bus 98.

Operations of the right stack are controlled by a right stack control unit 83, which includes lighting, clipping and plane equation engines. Clipping and lighting parameters are supplied by the host computer 15 to a clipping/lighting RAM 84.

The geometry accelerator performs transformations, decomposition of quadrilaterals, partial slope calculations for triangles and vectors, lighting (or shading), clipping, and plane equation (or slope) calculations of randomly oriented and defined quadrilaterals (quads), triangles, and vectors. The outputs are supplied to the scan converters in the frame buffer board 14 for rendering into pixel data and to texture mapping board 12 for generation of per pixel texture color values.

In FIG. 2, only the right stack contains a divider, in order to limit size and cost. Because the right stack contains a divider and the left stack does not, the partitioning of functionality of the geometry accelerator is for the left stack to perform transformations, partial slope calculations, clip checking, decomposition and some precalculations for lighting. The right stack performs lighting, clipping, and plane equation calculations. The basic flow of operations is for primitive data to be entered in the input FIFO 70 from the host computer. The primitive data is put into one of the vertex RAM buffers 71, 72. The left stack then performs transformations, decomposition, and partial slope calculations and places the results in one of the primitive RAM buffers 80, 81. When the left stack has completed its operations for a primitive, it notifies the right stack to begin operations on the primitive. The left stack can then start working on the next primitive. At the same time, the right stack performs lighting, clipping (if required), and plane equation calculations on the primitive that is in the primitive RAM buffer.

In an alternative embodiment, both the left and right stacks contain identical hardware, including dividers. In this configuration, functionality may be partitioned such that each stack performs the same operations on different primitives.

III. FP Numbers

The math result bus 98 often carries fp numbers, for example but not limited to, results from the fp execution unit 95, the fp multiplier 94, and the fp divide/square unit 93, that should be converted, or clamped, to a value between 0 and 1, inclusive. The results should be clamped to within this range so that no overflow occurs downstream of the geometry accelerator 32. Overflow can occur because the hardware that is downstream of the accelerator 32 generally utilizes fixed precision arithmetic.

Figure 3:
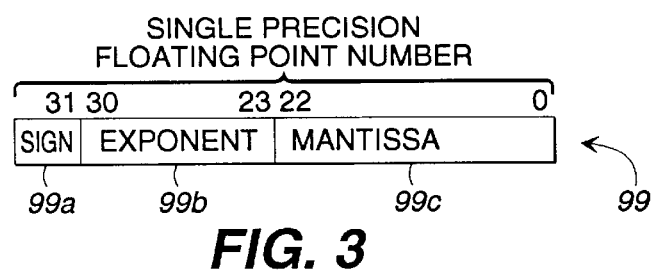
FIG. 3 is a schematic diagram of a fp number, which includes a sign, an exponent, and a mantissa field.

A typical widely accepted fp format is the IEEE 745 Standard Format proposed by the Institute of Electrical and Electronics Engineers (IEEE). This standard defines four fp formats: single, single extended, double, and double extended precision. In the preferred embodiment, the geometry accelerator 32 of FIG. 2 utilizes a single precision format 99 as shown in FIG. 3. Referring to FIG. 3, the fp number 99 includes a sign bit 99a (bit 31), an exponent field 99b (bits 30–23), and a mantissa field 99c (bits 22–0).

In order to determine the decimal value (base 10 number system) from the binary representation of FIG. 3, the decimal value is determined as follows:

$$\text{Decimal value} = (-1)^{sign} * (2^{EXPONENT-127}) * 1.\text{Mantissa}$$

In general, the clamping system 100 of FIG. 2 is utilized to clamp fp values on the math result bus 98 to within the range of 0 to 1, inclusive. Further, the clamping system 100 has the ability to take the absolute value of a fp value on the math result bus 98. Worth noting is that the clamping system 100 is capable of receiving a fp value during one cycle and providing the processed value to the math result bus 98 during the next cycle.

IV. Clamping System And Method

Figure 4:
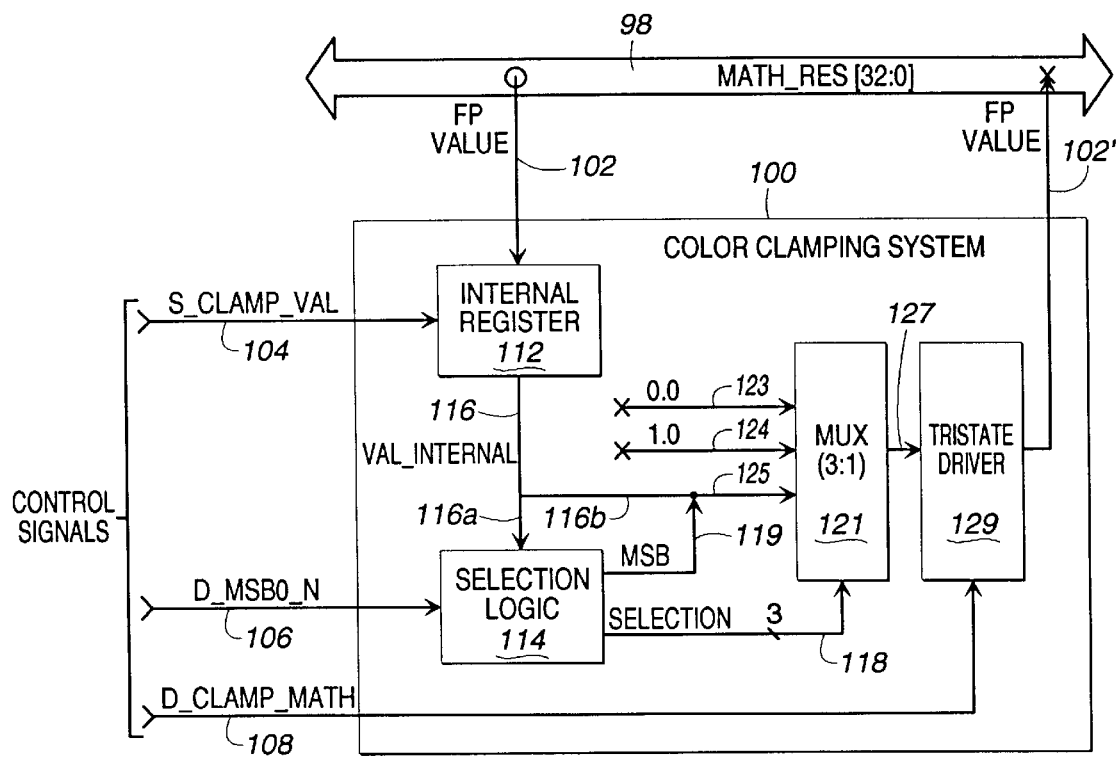
FIG. 4 is an electronic block diagram of a preferred embodiment of the clamping system of FIGS. 1 and 2.

The structure of the clamping system 100 is shown in detail in FIG. 4. With reference to FIG. 4, the clamping system 100 is capable of retrieving a fp value 102 from the math result bus 98, processing the fp value to produce a processed fp value 102', and communicating the processed fp value 102' to the math result bus 98. Processing by the clamping system 100 is controlled by three control signals 104, 106, 108: a set clamp value (s_clamp_val) signal 104, a dump msb0 not (msb means most significant bit; d_msb0_n) signal 106, and a dump clamp math (d_clamp_math) signal 108. The foregoing signals are generated by any suitable logic associated with the geometry accelerator 32 (FIG. 2). In the preferred embodiment, the signals 104, 106, 108 are produced by the right stack control unit 83 (FIG. 2). Generally, these control signals 104, 106, 108 control reading and writing by the clamping system 100 from the math result bus 98 and whether the absolute value of the fp value 102 is to be produced and provided to the bus 98.

In structure, the clamping system 100 includes an internal register 112 configured to receive the 32-bit fp value 102 from the math result bus 98 and the set clamp value signal 104, which is essentially a read control command. The internal register 112 temporarily stores the incoming fp value 102 and provides the incoming fp value 102 to selection logic 114 on an internal value connection (val_internal) 116, 116a. The selection logic 114 is configured to receive the d_msb0_n signal 106. The selection logic 114 generates three selection control signals 118 based upon the fp value on the internal value connection 116, 116a and the d_msb0_n signal 106. The selection logic 114 also outputs an msb signal 119, which is based upon the incoming d_msb0_n signal 106 and the MSB of val_internal, in order to implement an absolute value function.

A 3-to-1 mux 121 receives a 0 (in decimal) value 123, a 1 (in decimal; 0x3F800000 in hexadecimal) value 124, and a signal 125 that is a concatenation of the fp value on the internal value connection 116b and the msb bit 119. The MUX 121 is controlled by the selection signals 118 from the selection logic 114 to select one of the values 123–125 for output on the output connection 127.

A tristate driver 129 receives the selected value 127 from the MUX 121 and is configured to provide the fp value 102' to the math result bus 98. The tristate driver 129 receives and is controlled by the dump clamp math signal 108. In essence, the dump clamp math signal 108 is a write command signal for the tristate driver 129.

In the preferred embodiment, the clamping system 100 as well as its internal components 112, 114, 121, 129 operate synchronously with the math result bus 98 and other components within the geometry accelerator 32 of FIG. 1.

Operation of the clamping system 100 is as follows. When the set clamp value 104 is asserted by being driven a high ("1"), the internal register 112 reads and stores the fp value 102 from the math result bus 98. The fp value 102 is passed to the selection logic 114 via the internal value connection 116, 116a. The selection logic 114 evaluates the fp value from the internal value connection 116, 116a as well as the d_msb0_n signal 106. With the selection signals 118 and the msb signal 119, the selection logic 114 causes the fp value 102 to be clamped to 0, if the fp value 102 is less than or equal to 0, clamped to 1 if the fp value 102 is greater than or equal to 1, and permits the fp value 102 to be passed through the system 100 when it falls within the range of 0 to 1. Furthermore, the selection logic 114 will take the absolute value of the incoming fp value 102 when prompted to do so by the d_msb0_n signal 106.

The selection logic 114 asserts one of the three selection signals 118 to the MUX 121. Concurrently, the selection logic 114 either asserts or deasserts the MSB signal 119 that is concatenated with the fp value on the internal value connection 116b to produce the concatenated signal 125.

The MUX 121 is controlled to select the zero value 123 when the fp value 102 is less than or equal to –0.0 (i.e., 0 with a minus sign bit), is controlled to select the 1 value 124 when the fp value 102 is greater or equal to 1, and is controlled to select the concatenated value 125 when the fp value 102 is within the range between –0.0 and 1, exclusive and the d_msb0_n signal 106 is not asserted low. The MUX 121 outputs the selected value 127 to the tristate driver 129. When the dump clamp math signal 108 is asserted, the tristate driver 129 outputs the fp value 102' to the math result bus 98. The reading of the fp value 102 by the clamping system 100 and the writing of the processed fp value 102' to the math result bus 98 can occur on successive clock cycles.

Figure 5:
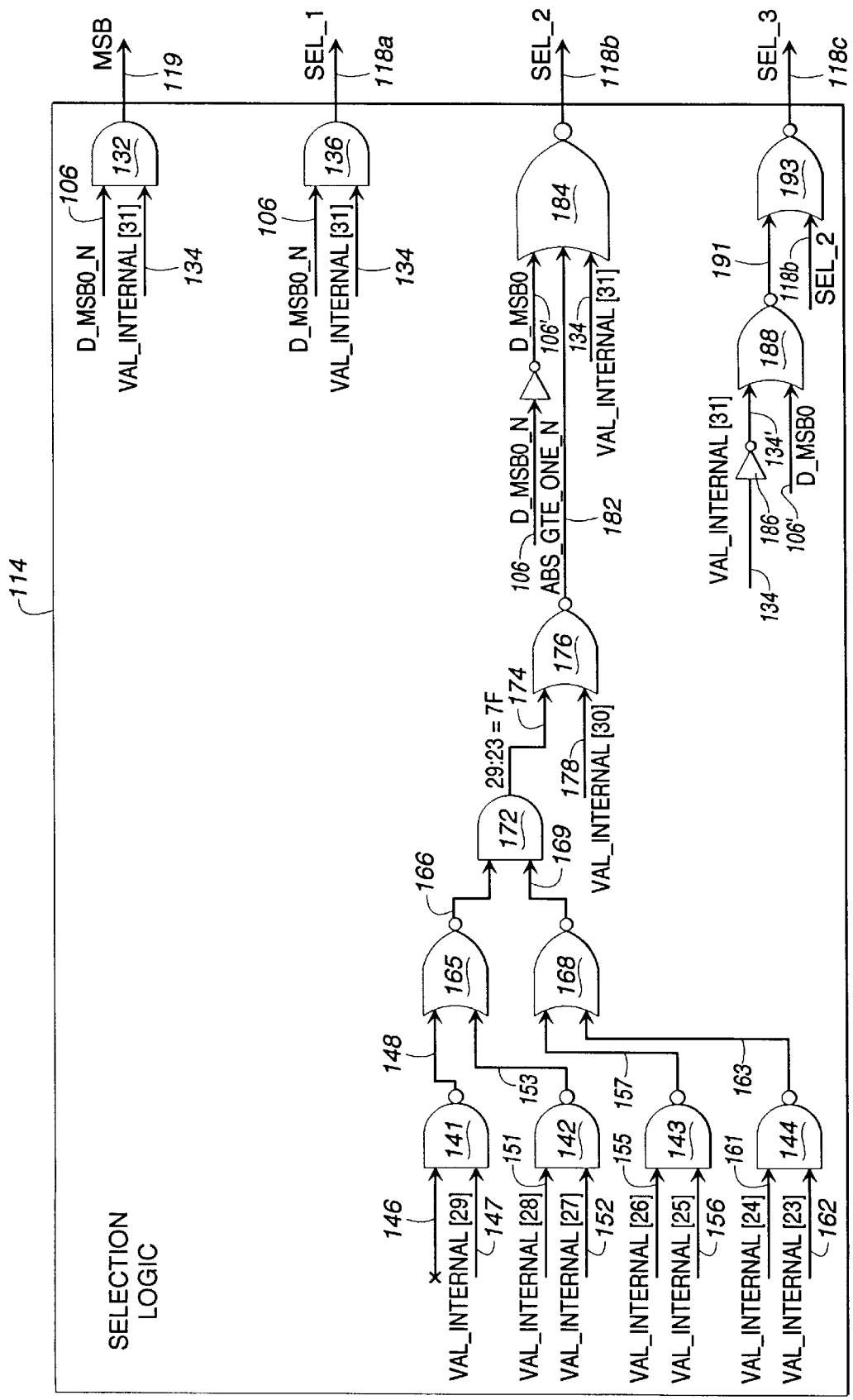
FIG. 5 is an electronic block diagram of the selection logic of FIG. 4.

The selection logic 114 is shown in greater detail in FIG. 5 by way of an electronic block diagram. The selection logic 114 can be designed using any suitable hardware. In the preferred embodiment, the selection logic 114 utilizes conventional combinational logic, or a network of interconnected and perhaps cascaded logic gates.

Referring to FIG. 5, the selection logic 114 includes an AND logic gate 132 that is configured to generate the msb signal 119 based upon the d_msb0_n signal 106 and the val internal[31] value 134 from the internal value connection 116, 116a (FIG. 4). Thus, the msb signal 119 will be deasserted and hence positive, whenever the d_msb0_n signal 106 is asserted by being pulled low, notwithstanding the state of the sign bit associated with the incoming fp value 102.

An AND gate 136 is configured to generate a first select (sel_1) signal 118a based upon the d_msb0_n signal 106 and the val_internal[31] value 134. The first select signal 118a is asserted when the fp value is less than or equal to –0.0. When the first select signal 118 is asserted by the selection logic 114, the MUX 121 will select value 123 (FIG. 4) corresponding with the 0 value.

The selection logic 114 further comprises logic for generating a second select (sel_2) signal 118b, which is asserted when the fp value is greater than or equal to 1. In this regard, the logic 114 includes NAND logic gates 141–144 that determine whether the seven lower bits of the exponent 99*b* (FIG. 3) are all set asserted or not. When they are all asserted, then the incoming fp value 102 must be greater than or equal to 1.0, in which case the fp value 102 should be clamped to 1.0. As shown, the NAND logic gate 141 receives a 1.0 value 147 and the val_internal[29] value 147. The NAND logic gate 142 receives the val_internal [28] value 151 and the val_internal[27] value 152 to produce an output 153. The NAND logic gate 143 receives the val_internal[26] value 155 and the val_internal[25] value 156 in order to produce an output 157. The NAND logic gate 144 receives the val_internal[24] value 161 and the val_internal[23] value 162 and generates an output 163. A NOR logic gate 165 receives the outputs 148, 153 and generates an output 166. A NOR logic gate 168 receives the outputs 157, 163 and generates an output 169.

An AND logic gate 172 receives the outputs 166, 169 from respective NOR logic gates 165, 168 and produces therefrom an output 174. The output 174 is asserted or deasserted to indicate whether or not val_internal[29:23] are all set at 1.

A NOR logic gate 176 receives the output 174 from the AND logic gate 172 and also receives the val_internal[30] value 178 in order to produce an output 182. When val_internal[30] is 1, then the fp value 102 must be greater than 1.0. Hence, the output 182 will be driven low to indicate that the fp value 102 is greater than or equal to 1.0 if all of val_internal[29:23] are at 1 and/or val_internal[30] is set at 1.

A NOR logic gate 184 receives the absolute-value-greater than-1-not (abs_gte_1_n) signal 182 from the NOR logic gate 176, a dump msb0 signal 106' (created by passing d_msb0_n through an inverter 184), and the val_internal [31] signal 134. Based upon the foregoing signals, the NOR logic gate 184 produces the second select signal 118*b*. Hence, the second select signal 118*b* is asserted or deasserted to indicate respectively whether or not: (a) the incoming fp value 102 is within the range of greater than or equal to 1.0, (b) the fp value 102 is not a negative value, and (c) the d_msb0_n signal is not asserted low.

The selection logic 114 further comprises logic for generating a third select (sel_3) signal 118*c*, which is asserted when the fp value is between −0.0 and 1, exclusive. When the third select signal 118*c* is asserted, the MUX 121 will select the value 125 that comprises the concatenated value. In this regard, an inverter 186 receives the val_internal[31] value 134 and provides the inversion 134' to a NOR logic gate 188. The NOR logic gate 188 also receives the d_msb0 signal 106' (inverse of d_msb0_n signal 106). Based upon the aforementioned signals, the NOR logic gate 188 produces an output 191.

A NOR logic gate 193 receives the output 191 from the NOR logic gate 188 and also receives the second select signal 118*b*. Based upon the signals 191, 118*b*, the NOR logic gate 193 produces the third select signal 118*c*. The third select signal 118*c* is asserted or deasserted to indicate respectively whether or not the concatenated value will be provided to the math result bus 98.

Many variations and modifications may be made to the preferred embodiment of the invention as described previously. For example, the clamping system could be implemented in software, as opposed to the herein described hardware implementation. All such modifications and variations are intended to be included herein within the scope of the present invention, as is defined by the following claims.

Finally, in the claims hereafter, the structures, materials, acts, and equivalents of all "means" elements, "logic" elements, and steps are intended to include any structures, materials, or acts for performing the functions specified in connection with said elements.

Wherefore, the following is claimed:

1. A clamping system for clamping floating point values from a geometry accelerator in a computer graphics system, comprising:

a register configured to receive said floating point value from a connection from said geometry accelerator;

logic configured to determine when said floating point value is less than or equal to a first threshold value, when said floating point value is greater than or equal to a second threshold value, and when said floating point value is between said first and second threshold values;

an output mechanism controlled by said logic, said output mechanism configured to output onto said connection said first threshold value when said floating point value is less than or equal to said first threshold value, to output onto said connection said second threshold value when said floating point value is greater than or equal to said second threshold value, and to output onto said connection said floating point value when said floating point value is between said first and second threshold values.

2. The system of claim 1, wherein said output mechanism is a multiplexer.

3. The system of claim 1, wherein said first and second threshold values are zero and one, respectively.

4. The system of claim 1, further comprising absolute value logic configured to associate a positive sign bit with said floating point value that is output by said output mechanism when said floating point value has a negative sign bit.

5. A clamping system for clamping floating point values from a geometry accelerator in a computer graphics system, comprising:

a register configured to receive a floating point value from a connection to said geometry accelerator;

an output mechanism configured to output onto said connection one of a first threshold value, a second threshold value, and a floating point value; and logic configured to evaluate said floating point value received by said register, said logic configured to control said output mechanism to output said first threshold value when said floating point value is less than or equal to said first threshold value, to output said second threshold value when said floating point value is greater than or equal to said second threshold value, and to output said floating point value when said floating point value is between said first and second threshold values.

6. The system of claim 5, further comprising an absolute value mechanism for converting said floating point value to a positive number when said floating point value is negative.

7. The system of claim 6, wherein said first and second threshold values are zero and one, respectively.

8. The system of claim 6, wherein said logic configured to evaluate said floating point value received by said register further comprises a network of interconnected logic gates.

9. The system of claim 8, wherein said output mechanism further comprises a multiplexer having a selection input coupled to said network of interconnected logic gates, a first input having said first threshold value applied thereto, a second input having said second threshold value applied thereto, a third input having said floating point value applied thereto, and an output coupled to said connection.

10. A system for clamping floating point values from a geometry accelerator in a computer graphics system, comprising:

a register electrically coupled to a bus, said register inputting a floating point value from said bus;

a network of interconnected logic gates coupled to said register;

a multiplexer having a selection input coupled to an output of said network of interconnected logic gates and an output coupled to said bus;

a first threshold value applied to a first input of said multiplexer;

a second threshold value applied to a second input of said multiplexer;

said floating point value being applied to a third input of said multiplexer; and wherein said network of interconnected logic gates is configured to apply a signal to said selection input enabling said multiplexer to output onto said bus (a) said first threshold value when said floating point value is less than or equal to said first threshold value, (b) said second threshold value when said floating point value is greater than or equal to said second threshold value, and, (c) said floating point value when said floating point value is between said first and second threshold values.

11. The system of claim 10, wherein said output of said multiplexer is coupled to said bus through a tristate driver.

12. A system for clamping floating point values from a geometry accelerator in a computer graphics system, comprising:

a first means for inputting a floating point value from a bus;

a second means for determining whether the floating point value is less than or equal to a first threshold value;

a third means for determining whether said floating point value is greater than or equal to a second threshold value;

a fourth means for determining whether said floating point value is between said first and second threshold values;

a fifth means for outputting said first threshold value onto said bus when said floating point value is less than or equal to said first threshold value, said second threshold value onto said bus when said floating point value is greater than or equal to said second threshold value, and said floating point value onto said bus when said floating point value is between said first and second threshold values.

13. The system of claim 12, further comprising an absolute value means for converting said floating point value to a positive number when said floating point value is negative.

14. The system of claim 13, wherein said fifth means further comprises a sixth means for applying one of a plurality of inputs to said bus, the inputs including a first input having said first threshold value applied thereto, a second input having said second threshold value applied thereto, and a third input having said floating point value applied thereto.

15. The system of claim 14, wherein second, third, and fourth means are each implemented in a network of interconnected logic gates.

16. The system of claim 15, wherein said sixth means further comprises a means for selecting one of the plurality of inputs, said means for selecting one of the inputs being controlled by the network of interconnected logic gates.

17. The system of claim 16, wherein said first and second threshold values are zero and one, respectively.

18. A method for clamping floating point values in a geometry accelerator in a computer graphics system comprising the steps of applying a floating point value from a bus to a network of interconnected logic gates coupled to said bus;

generating a first output signal in said network of interconnected logic gates when said floating point value is less than or equal to a first threshold value and applying said first output signal to an output mechanism coupled to said network of interconnected logic gates;

generating a second output signal in said network of interconnected logic gates indicating that said floating point value is greater than or equal to a second threshold value and applying said second output signal to said output mechanism;

generating a third output signal in said network of interconnected logic gates indicating that said floating point value is between said first and second threshold values and applying said third output signal to said output mechanism;

outputting said first threshold value onto said bus from said output mechanism in response to said first output signal;

outputting said second threshold value onto said bus from said output mechanism in response to said second output signal; and outputting said floating point value onto said bus from said output mechanism in response to said third output signal.

19. The method of claim 18, wherein:

the step of outputting said first threshold value onto said bus from said output mechanism in response to said first output signal further comprises the steps of applying said first threshold value to a first input of a multiplexer and triggering said multiplexer to output said first threshold value onto the bus;

the step of outputting said second threshold value onto said bus from said output mechanism in response to said second output signal further comprises the steps of applying said second threshold value to a second input of said multiplexer and triggering said multiplexer to output said second threshold value onto said bus; and the step of outputting said floating point value onto said bus from said output mechanism in response to said third output signal further comprises the steps of applying said floating point value to a third input of said multiplexer and triggering said multiplexer to output said floating point value onto said bus.

20. The method of claim 19, wherein the step of applying said floating point value from said bus to said network of interconnected logic gates coupled to said bus further comprises the steps of:

receiving said floating point value in a register having an input coupled to said bus, said register having an output coupled to said network of interconnected logic gates; and outputting said floating point value from said register to said network of interconnected logic gates.

21. The method of claim 20, further comprising the step of determining an absolute value of said floating point value.

22. The method of claim 21, further comprising the step of applying said output of said multiplexer to said bus by triggering a tristate driver.

23. The method of claim 22, wherein the step of applying said first threshold value to a first input of said multiplexer further comprises applying a value of zero to said second input, and said step of applying said second threshold value to a second input of said multiplexer further comprises applying a value of one to the second input.

* * * * *